United States Patent
Fang

(10) Patent No.: US 9,810,408 B2
(45) Date of Patent: Nov. 7, 2017

(54) PORTABLE LIGHTING APPARATUS

(71) Applicant: Ningbo Utec Electric Co. Ltd., Yuyao, Zhejiang (CN)

(72) Inventor: Yi Fang, Zhejiang (CN)

(73) Assignee: Ningbo Utec Electric Co., Ltd. (CN)

( * ) Notice: Subject to any disclaimer, the term of this patent is extended or adjusted under 35 U.S.C. 154(b) by 274 days.

(21) Appl. No.: 14/682,275

(22) Filed: Apr. 9, 2015

(65) Prior Publication Data
US 2016/0298831 A1    Oct. 13, 2016

(51) Int. Cl.
| F21V 21/06 | (2006.01) |
| F21V 17/00 | (2006.01) |
| F21S 6/00  | (2006.01) |
| F21V 27/02 | (2006.01) |
| F16M 1/00  | (2006.01) |
| F21V 21/22 | (2006.01) |
| F21V 21/26 | (2006.01) |
| F21V 21/30 | (2006.01) |
| F21V 17/02 | (2006.01) |
| F21W 131/10 | (2006.01) |
| F21Y 105/10 | (2016.01) |
| F21Y 115/10 | (2016.01) |

(52) U.S. Cl.
CPC .............. F21V 21/06 (2013.01); F16M 1/00 (2013.01); F21S 6/005 (2013.01); F21V 17/007 (2013.01); F21V 27/02 (2013.01); *F21V 17/02* (2013.01); *F21V 21/22* (2013.01); *F21V 21/26* (2013.01); *F21V 21/30* (2013.01); *F21W 2131/10* (2013.01); *F21Y 2105/10* (2016.08); *F21Y 2115/10* (2016.08)

(58) Field of Classification Search
CPC ........ F21V 21/06; F21V 17/007; F21V 27/02; F15M 1/00; F21S 6/005
See application file for complete search history.

(56) References Cited

U.S. PATENT DOCUMENTS

| 8,087,797 B2* | 1/2012 | Pelletier | F21L 2/00 362/190 |
| 8,201,979 B2* | 6/2012 | Deighton | F16M 11/28 248/177.1 |
| 2005/0117340 A1* | 6/2005 | Lee | F21L 14/00 362/249.16 |
| 2009/0135611 A1* | 5/2009 | Lin | F21L 4/00 362/372 |
| 2013/0265780 A1* | 10/2013 | Choksi | F21V 21/145 362/373 |

* cited by examiner

*Primary Examiner* — Anabel Ton
(74) *Attorney, Agent, or Firm* — Raymond Sun

(57) ABSTRACT

A lighting apparatus has an upper hub, a base, a lower hub, and a pair of illumination devices that are pivotably supported at the upper hub, with each illumination device being pivotable up and down towards each other, as well as being rotatable. A telescoping shaft assembly has an inner shaft and an outer shaft, with the inner shaft telescopically received inside the outer shaft, the inner shaft having an upper end that is secured to the upper hub, and the outer shaft having a lower end that is secured to the base. A plurality of legs are connected to the lower hub and the base for pivoting motion therebetween.

15 Claims, 9 Drawing Sheets

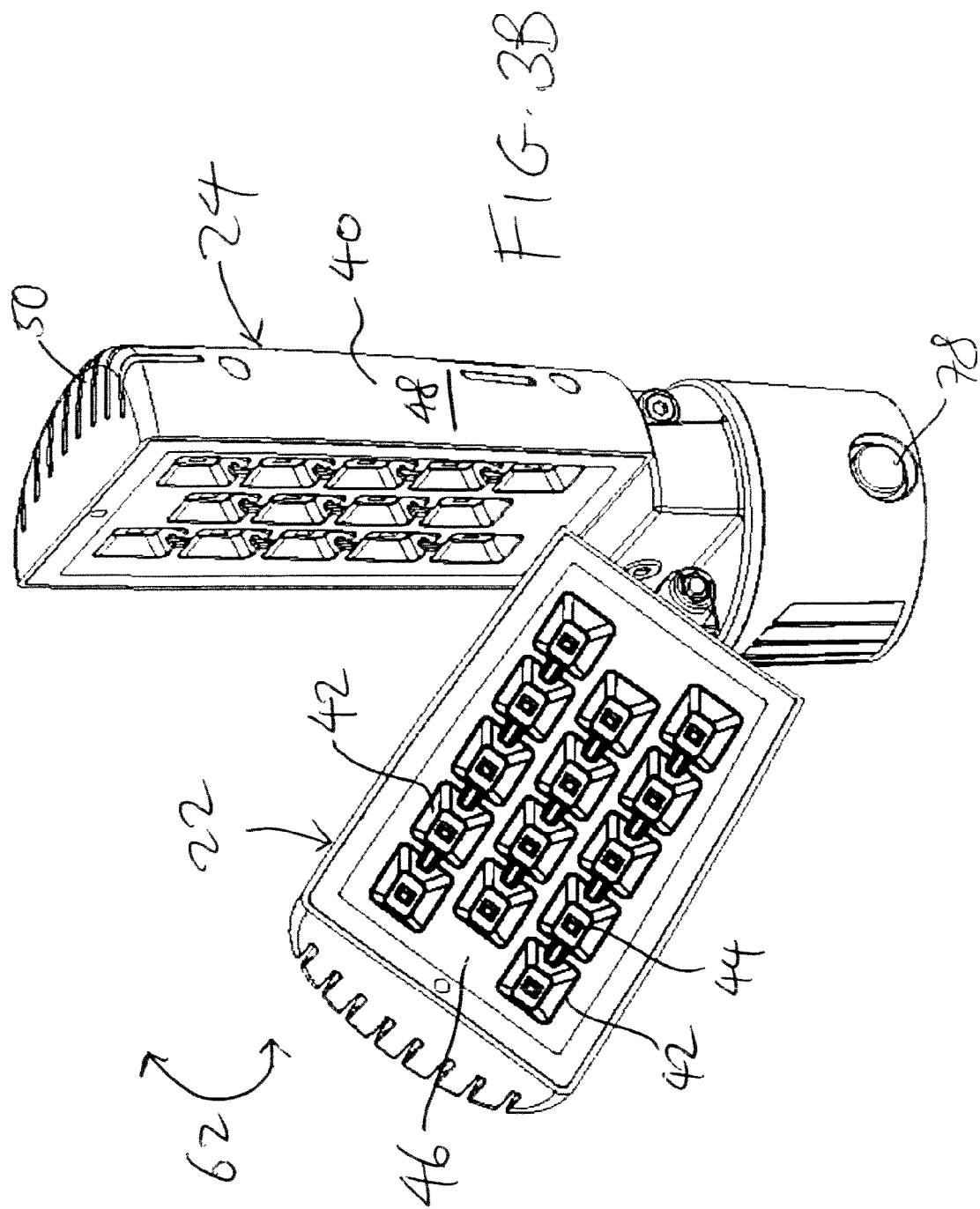

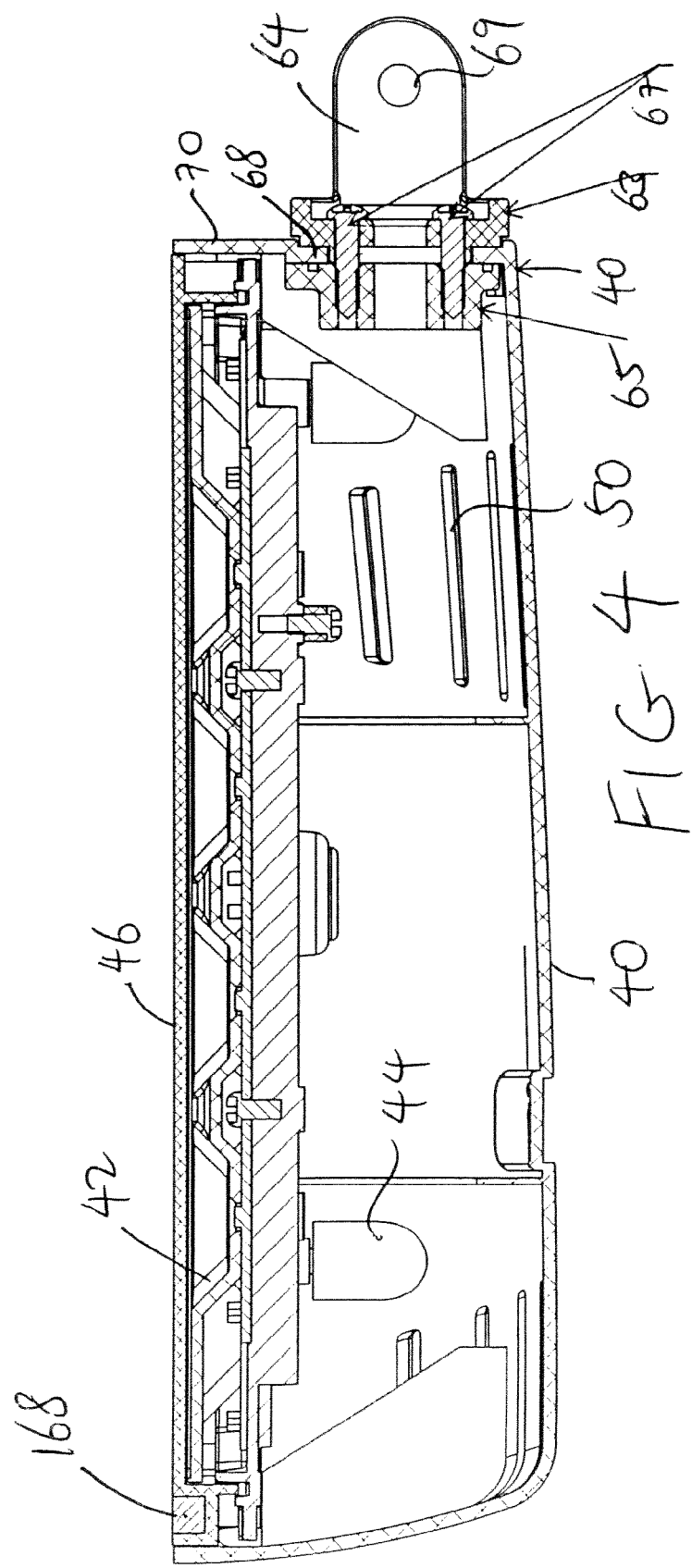

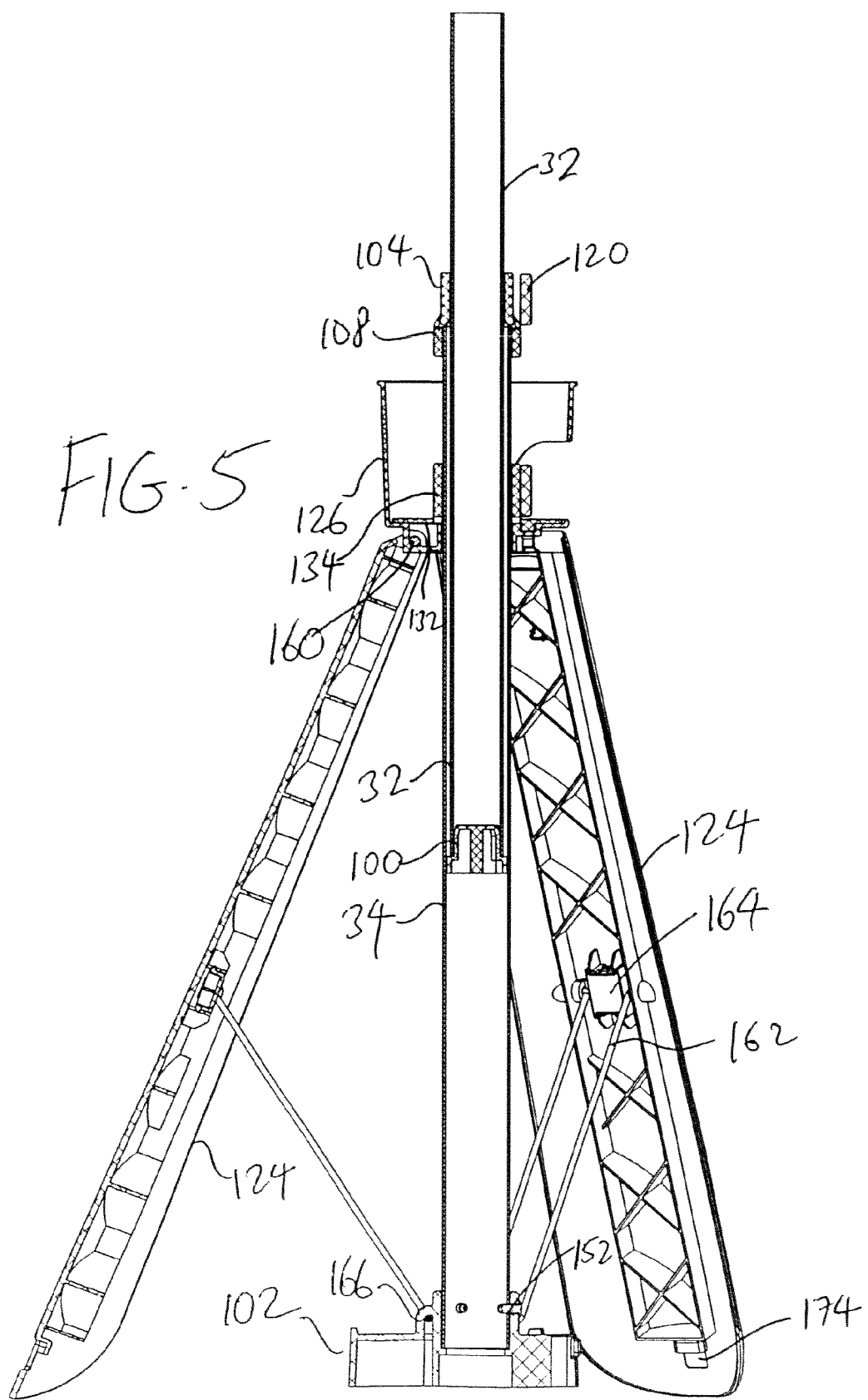

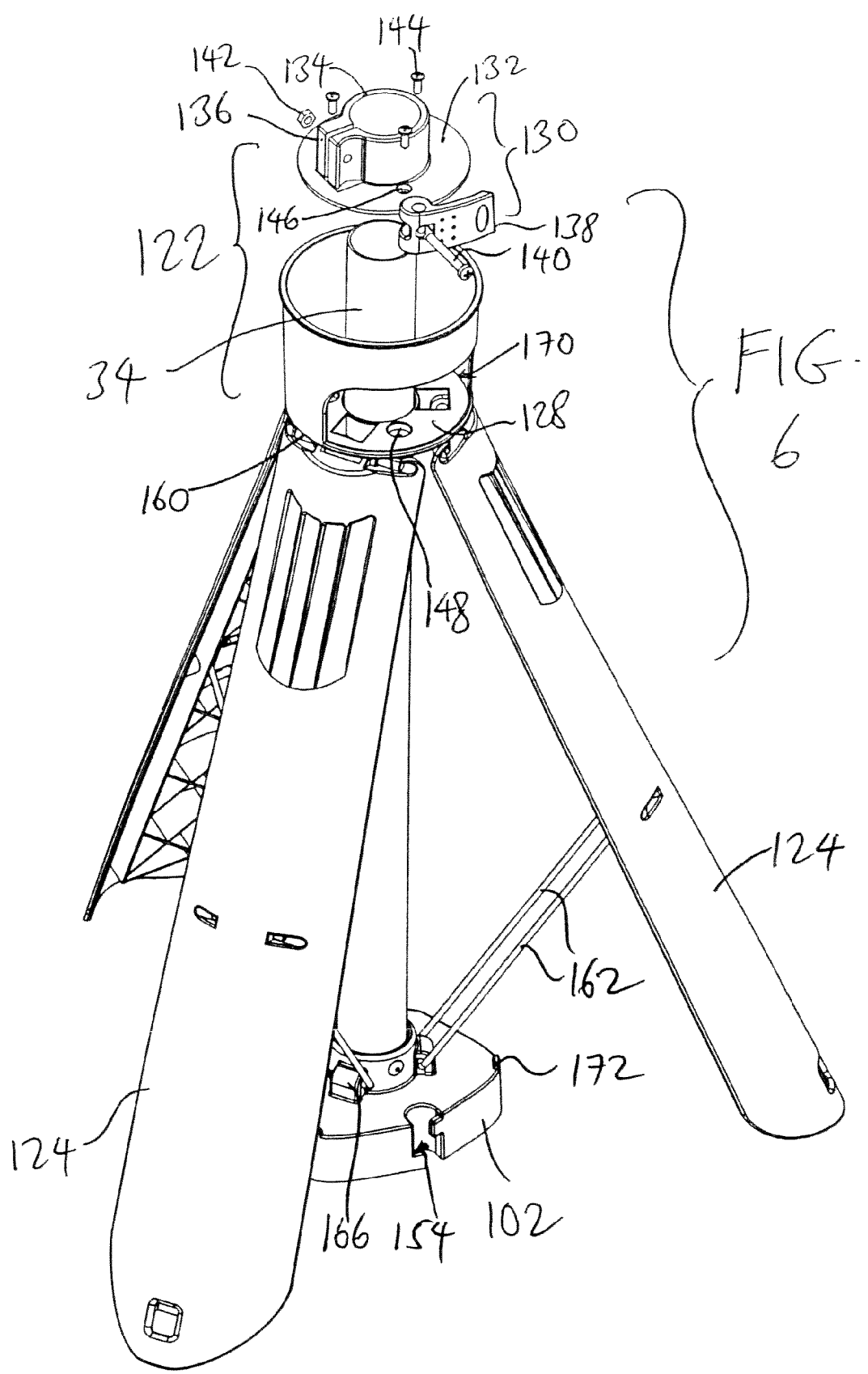

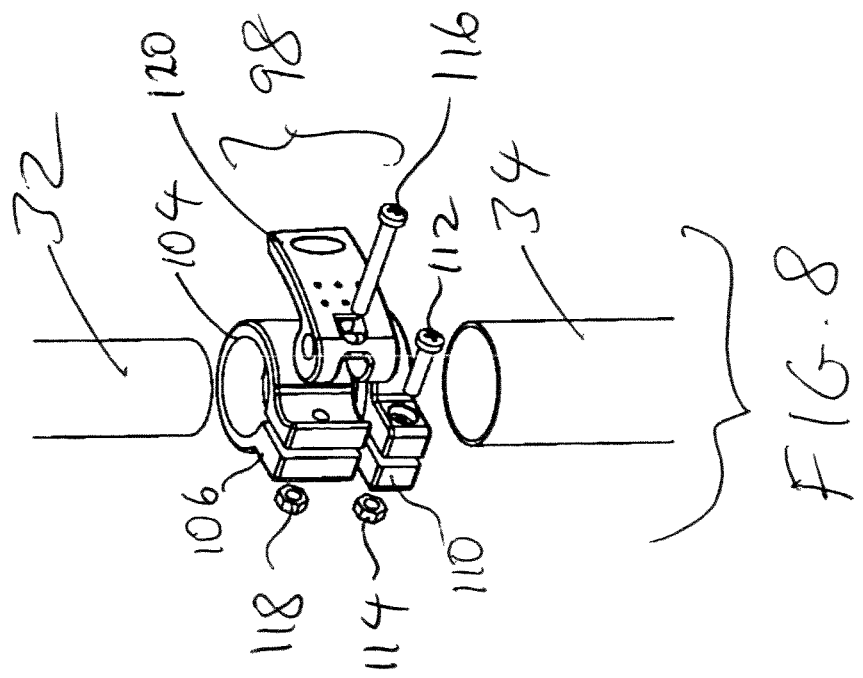
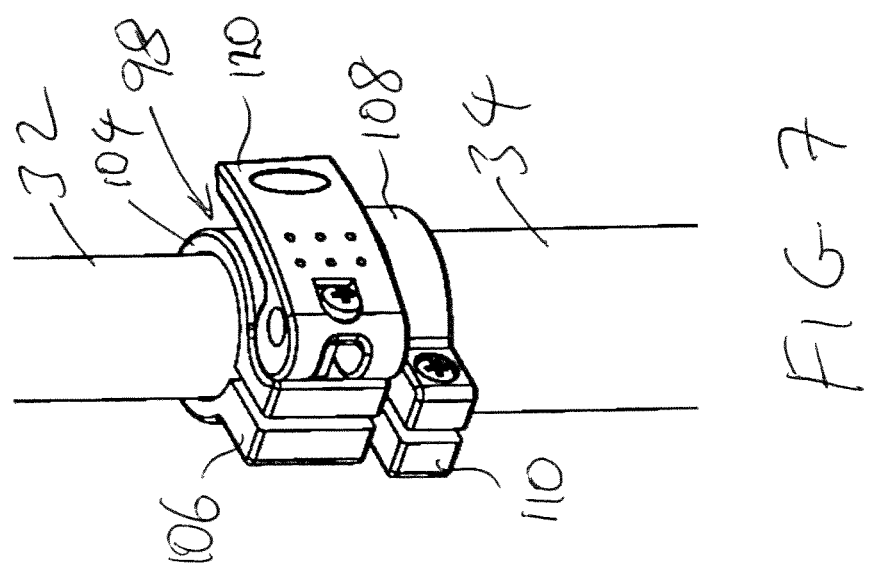

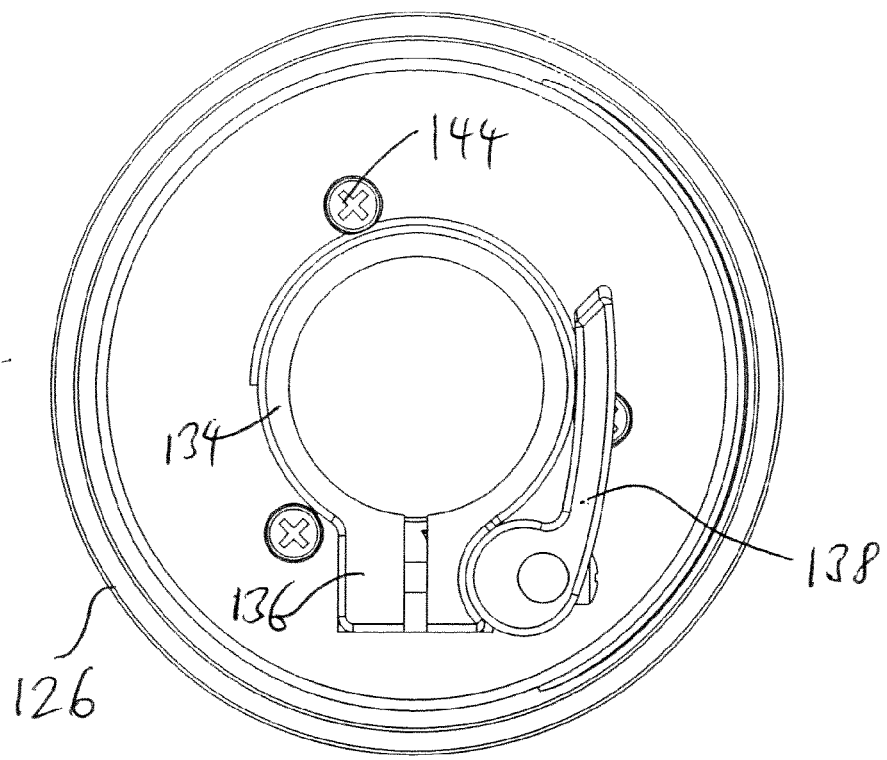
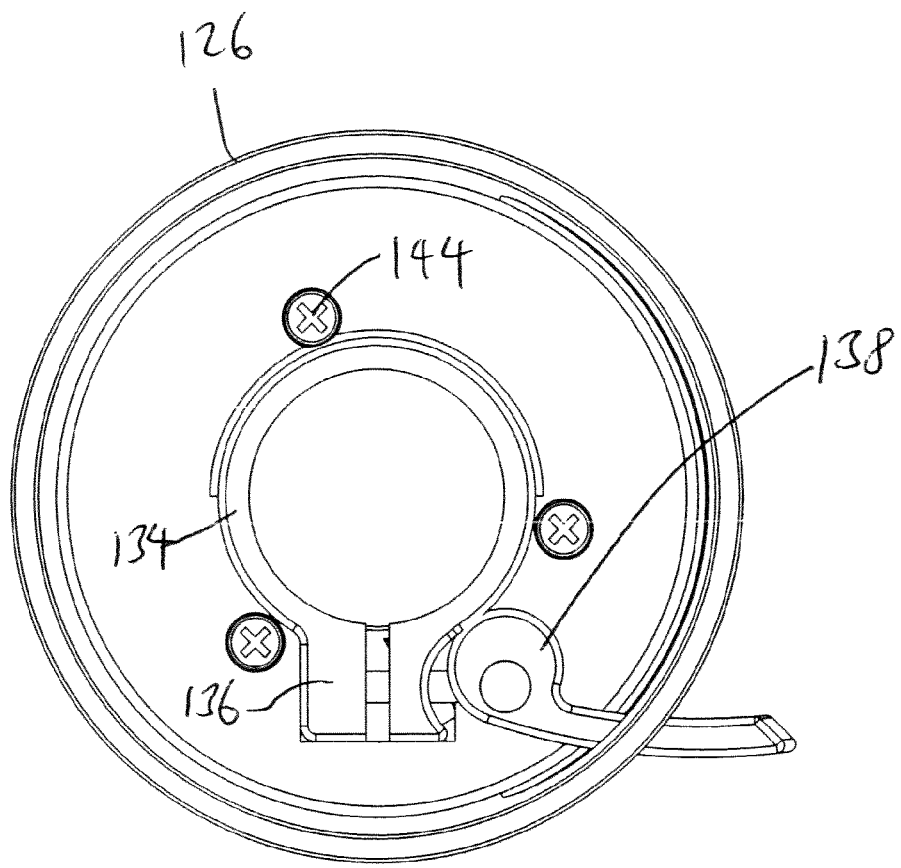

PORTABLE LIGHTING APPARATUS

BACKGROUND OF THE INVENTION

1. Field of the Invention

The present invention relates to a lighting apparatus, and in particular, to a portable lighting apparatus that can be used to illuminate a large area, and which can be collapsed into a smaller configuration for storage and transportation.

2. Description of the Related Art

There is a wide variety of lighting apparatus that are available to accommodate the many lighting needs inside homes, offices and large meeting areas or buildings. There are also lighting apparatus that are adapted for outdoor use. Some of the lighting apparatus are fixed in that they are secured to permanent locations (e.g., wall or ceiling lights), while others are portable in that they can be moved from one location to another location.

Many of the existing portable lighting apparatus suffer from several drawbacks. First, many of them are large and bulky, and cannot be conveniently moved from one location to another location. Second, the illumination that is delivered by the light bulbs, lamps or LEDs on these portable apparatus is often directed at a fixed direction or orientation, so that the illumination cannot be adjusted unless the location or orientation of the lighting apparatus is adjusted.

Thus, there remains a need for a portable lighting apparatus that can deliver illumination to a large space in a manner where the illumination can be adjusted without moving the lighting apparatus, and which can also be conveniently packed for storage and moved around.

SUMMARY OF THE INVENTION

It is an object of the present invention is to provide a portable lighting apparatus which can deliver illumination to a large space.

It is another object of the present invention is to provide a portable lighting apparatus where the direction and orientation of the illumination can be conveniently adjusted.

It is a further object of the present invention is to provide a portable lighting apparatus which can be conveniently packed for convenient storage or transportation.

To accomplish these objectives, the present invention provides a lighting apparatus that has an upper hub, a base, a lower hub, and a pair of illumination devices that are pivotably supported at the upper hub, with each illumination device being pivotable up and down towards each other, as well as being rotatable. A telescoping shaft assembly has an inner shaft and an outer shaft, with the inner shaft telescopically received inside the outer shaft, the inner shaft having an upper end that is secured to the upper hub, and the outer shaft having a lower end that is secured to the base. A plurality of legs are connected to the lower hub and the base for pivoting motion therebetween.

In accordance with one embodiment of the present invention, each illumination device is pivotably supported at a hub, with the illumination device being pivotable up and down, as well as being rotatable. The illumination device has a housing that houses a light source, and a connection bracket secured at an opening in a bottom wall of the housing to an inner block. The bracket has at least one leg that has an opening, the leg being pivotably connected to the hub for up-down pivoting motion via a pivoting sleeve that extends up from the hub, and further including a pivoting shaft that extends through the sleeve and the opening in the leg so that the illumination device is pivoted up and down along the axis defined by the shaft. A portion of the bottom wall is sandwiched between the bracket and the inner block in a manner such that the housing can be rotated

BRIEF DESCRIPTION OF THE DRAWINGS

FIG. 3B is an enlarged view of the illumination device of the lighting apparatus of FIG. 1 shown with one illumination device adjusted to another position.

FIG. 4 is a cross-sectional view of an illumination device.

FIG. 5 is a cross-sectional view of the leg assembly and lower hub of the lighting apparatus of FIG. 1.

FIG. 6 is a semi-exploded perspective view of the leg assembly and lower hub of the lighting apparatus of FIG. 1.

FIG. 7 illustrates the first clamping assembly of the lighting apparatus of FIG. 1.

FIG. 8 is an exploded view of the first clamping assembly of FIG. 7.

FIG. 9 is a top plan view of the hub of the lighting apparatus of FIG. 1 shown with the handle in the closed position.

FIG. 10 is a top plan view of the hub of the lighting apparatus of FIG. 1 shown with the handle in the opened position.

DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a portable lighting apparatus 20 which is large enough to support illumination devices 22 and 24 that can illuminate a large space, yet can be folded and collapsed into a smaller and slimmer profile so that it can be conveniently stored or transported to a different location for use. In addition, the illumination devices 22 and 24 can be adjusted so that the orientation and direction of the illumination can be adjusted without the need to move the lighting apparatus 20.

Figure 1:
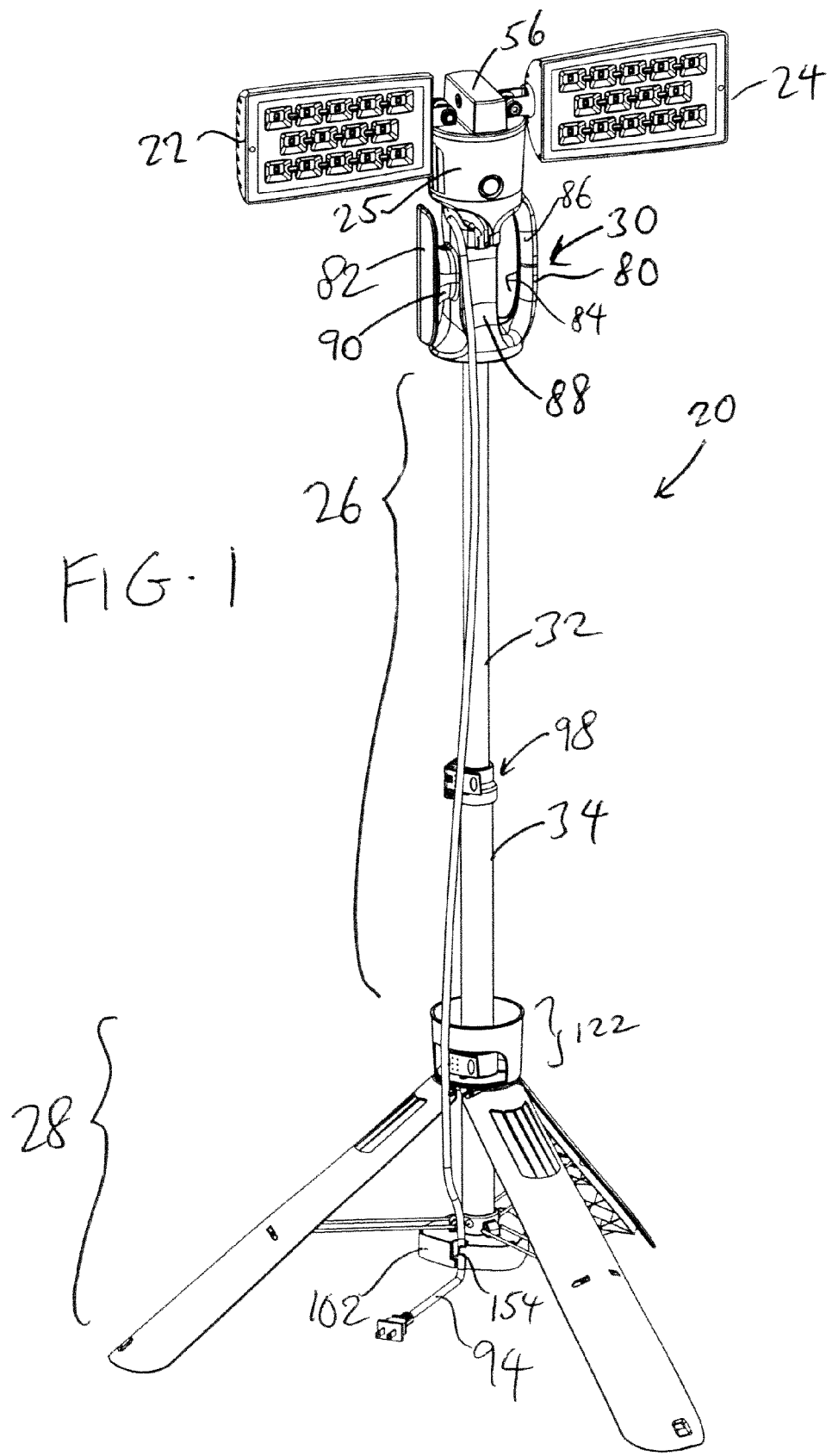
FIG. 1 is a perspective view of a portable lighting apparatus according to the present invention shown in the opened position.

FIG. 1 illustrates the lighting apparatus 20 in an opened position during normal use. The lighting apparatus 20 has a pair of illumination devices 22 and 24 that are pivotably supported at an upper hub 25 at the upper end of a telescoping shaft assembly 26 that has two telescoping shafts 32 and 34. A foldable leg assembly 28 is provided at the bottom end of the shaft assembly 26. A handle assembly 30 is provided at the upper end of the shaft assembly 26 adjacent the illumination devices 22 and 24.

Figure 2:
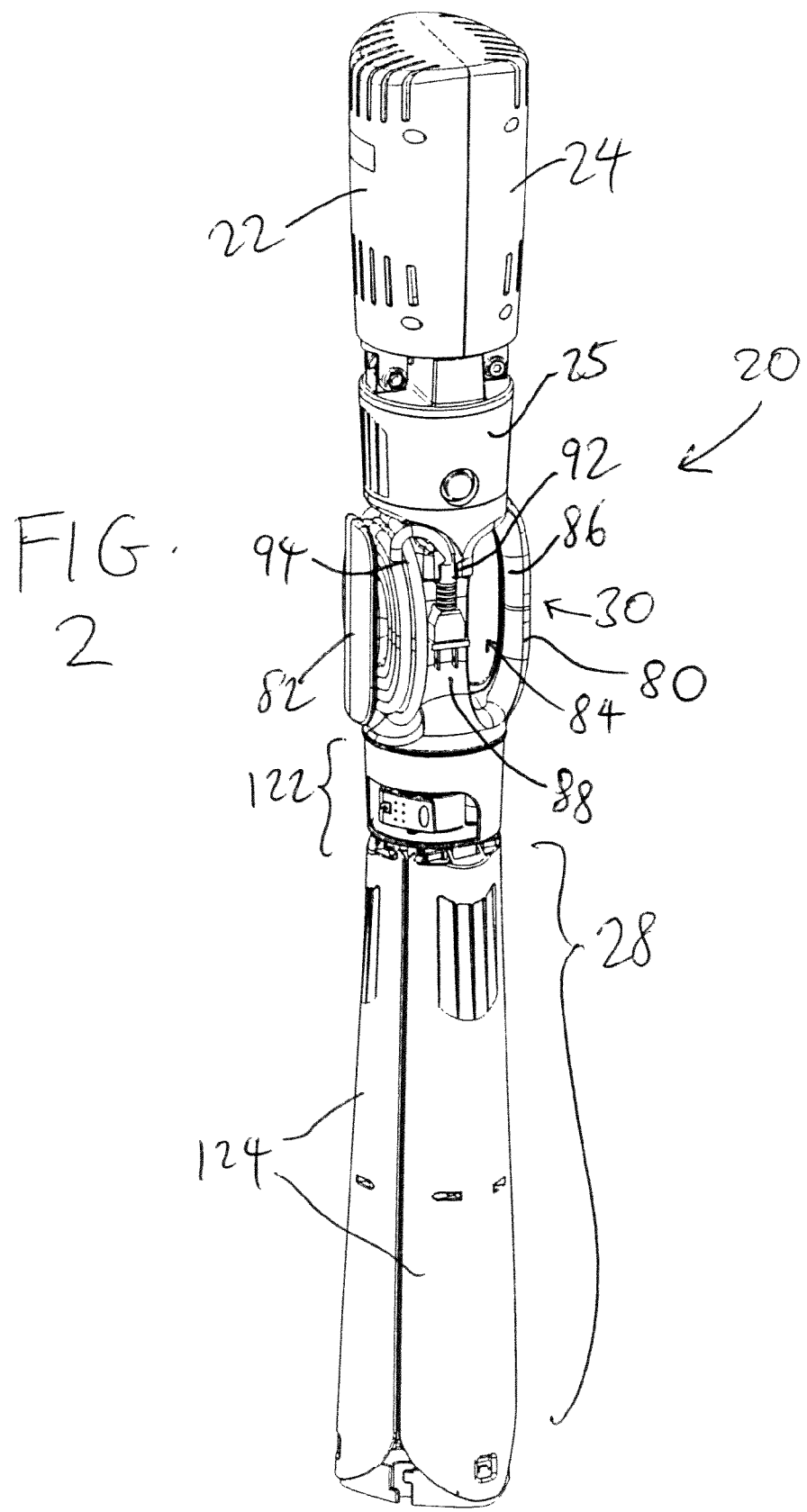
FIG. 2 is a perspective view of the lighting apparatus of FIG. 1 shown in the closed or collapsed position.

FIG. 2 illustrates the lighting apparatus 20 folded and collapsed to a storage position where the illumination devices 22 and 24 are folded towards each other, and the shafts 32 and 34 are telescoped with one inside the other and stored inside the space defined by the folded legs of the leg assembly 28.

Figure 3A:
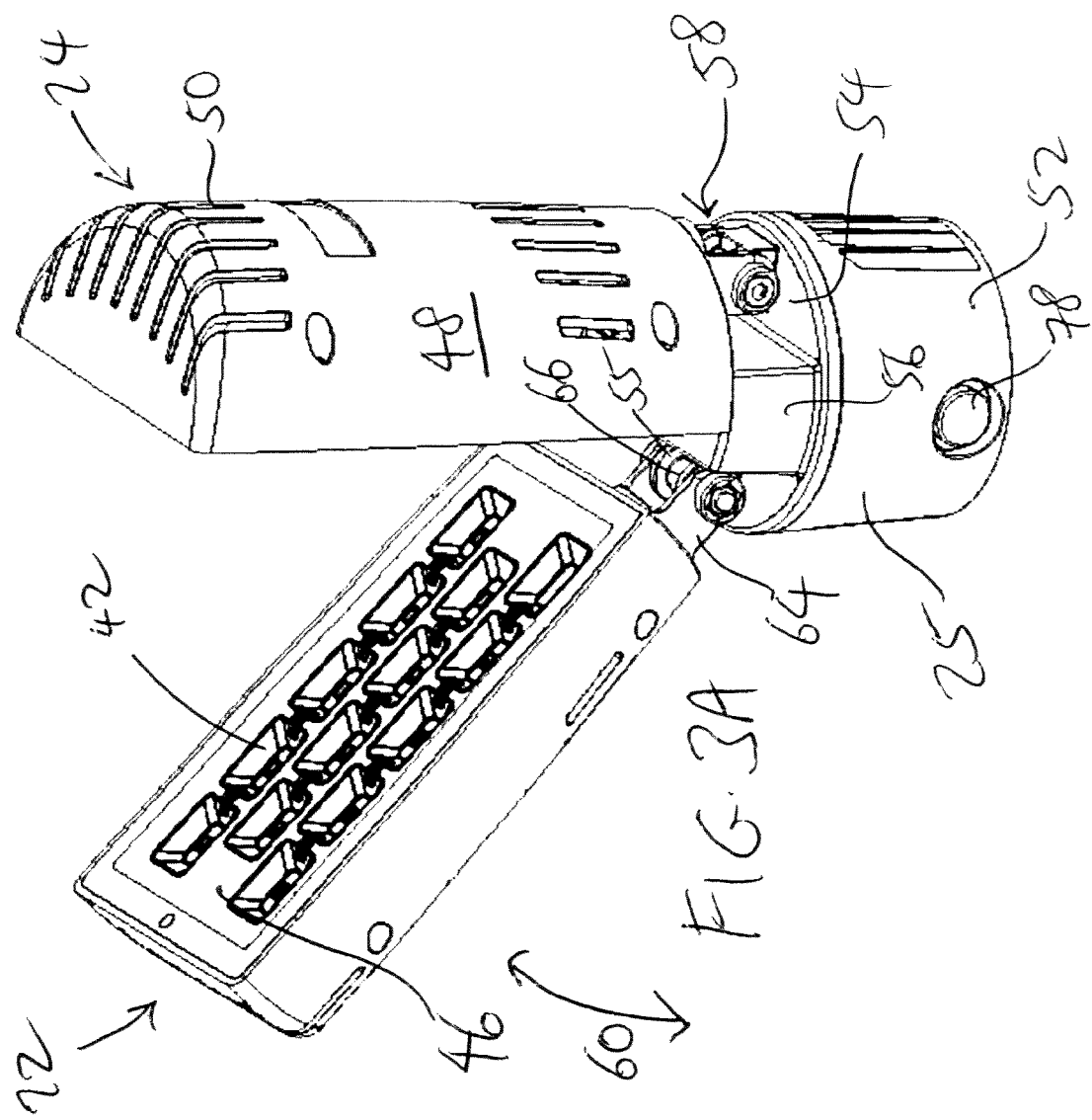
FIG. 3A is an enlarged view of the illumination device of the lighting apparatus of FIG. 1 shown with one illumination device adjusted to one position.

Referring to FIGS. 3-4, the illumination devices 22 and 24 can be identical to each other. Each illumination device 22 has a housing 40 that houses an array of sinks or wells 42. Illuminating elements 44 are positioned inside. These illuminating elements 44 can be conventional LEDs. The array of wells 42 can be configured in any manner, and FIGS. 3-4 shows the array as consisting of three rows of wells 42, with the middle row having four wells 42, and the two outer rows having five wells 42. The wells 42 are arranged to be exposed along an inner transparent or translucent wall 46 that can be generally flat in configuration. The housing 40 can have a curved or semi-cylindrical outer wall 48 that is sized and configured to correspond to the semi-cylindrical outer wall of the upper hub 25, the lower hub 122, and the legs 124 described below so that the entire lighting apparatus 20 can have a slim and consistent profile in the closed position, as shown in FIG. 2. A plurality of vent slits or openings 50 can be provided in the outer wall 48 to vent heat from inside the housing 40 to the exterior environment. The housing 40 also houses circuitry and other well-known connections and components that are typically used to connect the illuminating elements 44 to a power supply.

The illumination devices 22 and 24 are pivotably connected to the hub 25 that is positioned at the upper end of the shaft assembly 26. The hub 25 has a generally cylindrical housing 52 with a flat upper surface 54. An on/off button 78 can be provided in the cylindrical wall of the hub 25 for turning the illumination devices 22, 24 on and off.

A block 56 extends across the center of the upper surface 54, and a pivoting assembly 58 is provided on the upper surface 54 on either side of the block 56. Each pivoting assembly 58 includes one or more sleeves 55 that extend from the upper surface 54, and which function to support one illumination device 22 or 24 in a manner where the illumination device 22 or 24 can be pivoted up and down (see arrow 60 in FIG. 3), and then rotated (see arrow 62 in FIG. 4). Each illumination device 22 and 24 has a connection bracket 63 with a pair of legs 64 extending therefrom, the bracket 63 connected to the bottom wall 70 of its housing 40. Each leg 64 has an opening 69 at its lower end so that a shaft 66 can be extended through the sleeve(s) 55 and the openings in the two legs 64 of each illumination device 22 and 24. Thus, each illumination device 22 and 24 can be pivoted up and down along the axis defined by the shaft 66.

In addition, the bracket 63 is secured at an opening (see FIG. 4) at the bottom wall 70 of the housing 40 to an inner block 65 via two screws 67. A portion 68 of the bottom wall 70 of the housing 40 is sandwiched between the bracket 63 and the inner block 65 in a manner such that the housing 40 can be rotated about an axis defined by the two screws 67. Thus, the housing 40 can be rotated by 360 degrees about the axis defined by the two screws 67, and the housing 40 can be pivoted up and down about the axis defined by the shaft 66.

Thus, each illumination device 22 and 24 can be pivoted up and down as shown in FIG. 3 so that the two illumination devices 22 and 24 can be opened apart to illuminate a wide area (see FIG. 1), or folded against each other for storage (see FIG. 2) in a manner such that the outer profile of the semi-cylindrical outer walls 48 is aligned with the profile of the cylindrical housing 52. In addition, once the illumination devices 22, 24 are pivoted down to the point where the legs 64 abut the upper surface 54 to act as a stop element, the illumination devices 22 and 24 can be rotated about the axis defined by the two screws 67. Thus, the illumination devices 22 and 24 can be adjusted so that they can be positioned to direct illumination at different angles and orientations. When the lighting apparatus 20 is to be collapsed for storage, the illumination devices 22 and 24 are folded upwardly along the pivot axis of the shaft 66 until the bottom wall of each housing 40 is seated on top of the block 56.

The handle assembly 30 is located just below the hub 25. The handle assembly 30 can be formed in one piece with the hub 25, or they can be provided as separate pieces or components and then secured together. The handle assembly 30 includes a handle grip section and a wire storage section. The handle grip section provides a handle grip 80 with a handle opening 84 with an inner wall 86 along the handle grip 80. The wire storage section has an outer plate 82 connected to the inner core 88 by a stem 90. A clip 92 is provided along a portion of the inner core 88. An electrical wire 94 originates from the inner core 88 of the handle assembly 30 and can be wound around the stem 90, with the socket head secured in the clip 92, when the lighting apparatus 20 is to be collapsed for storage, as shown in FIG. 2. When the lighting apparatus 20 is in use, the wire 94 can be unwound and plugged into an electrical outlet, as shown in FIG. 1. The outer plate 82 functions to keep the wound wire 94 inside the outer profile of the handle assembly 30. The outer profile of the handle 80 and the outer plate 82 are also configured to align with the outer profiles of the hub 25 and the illumination devices 22 and 24 so that the lighting apparatus 20 can maintain a consistent and streamlined profile when it is folded up for storage.

The shaft assembly 26 and the leg assembly 28, and how these assemblies are deployed and folded up, are shown in FIGS. 5-10. The shaft assembly 26 includes an inner shaft 32 and an outer shaft 34, the outer shaft 34 having a larger diameter than the inner shaft 32 so that the inner shaft 32 can slide telescopically inside the outer shaft 34. The upper end of the inner shaft 32 is secured to the Inner core 88 of the handle assembly 30, and the lower end of the inner shaft 32 is secured to a stopper 100 that is positioned inside the bore of the outer shaft 34. The upper end of the outer shaft 34 is secured to a first clamping assembly 98 (see FIGS. 7 and 8) and the lower end of the outer shaft 34 is secured to a base 102 of the lighting apparatus 20.

Referring to FIGS. 7-8, a first clamping assembly 98 has a first upper ring 104 that has flanges 106 at its opposing ends. A second lower ring 108 is positioned below the upper ring 104, and also has flanges 110 at its opposing ends. The lower ring 108 has a slightly larger diameter than the upper ring 104, and is adapted to receive the larger-diameter outer shaft 34, with the upper ring 104 adapted to receive the smaller-diameter inner shaft 32. The rings 104 and 108 can be made of plastic. A screw 112 extends through openings in the flanges 110 and is secured tight by a bolt 114 so that the outer shaft 34 is secured inside the lower ring 108 in a manner such that the outer shaft 34 cannot experience any sliding motion. A handle 120 is pivotably secured to the flanges 106 of the upper ring 104 by a screw 116 which extends through an opening in the handle 120 and openings in the flanges 106. The screw 116 is secured by a bolt 118. The handle 120 may be pivoted between an open and closed position in the same manner illustrated below for the handle 138 in FIGS. 9-10. When the handle 120 is in the open position, the upper ring 104 is loosened so that the inner shaft 32 can experience sliding motion inside the upper ring 104. When the handle 120 is in the closed position, the upper ring 104 is tightened so that the inner shaft 32 cannot experience any sliding motion inside the upper ring 104.

The leg assembly 28 includes a lower hub 122, the base 102, and a plurality of foldable legs 124. As best shown in FIGS. 5-6 and 9-10, the hub 122 is located adjacent the upper end of the outer shaft 34, and has a cylindrical housing 126 that has a bottom wall 128.

A second clamping assembly 130 is seated on top of the bottom wall 128, and has a bottom plate 132 with a ring 134 provided in the middle thereof. The bottom wall 128 has an opening (not shown) that is aligned with the internal bore of the ring 134. The ring 134 has flanges 136 at its opposing ends. A handle 138 is pivotably secured to the flanges 136 of the ring 134 by a screw 140 which extends through an opening in the handle 138 and openings in the flanges 136. The screw 140 is secured by a bolt 142. The handle 138 may be pivoted between an open and closed position as shown in FIGS. 10 and 9, respectively. When the handle 138 is in the open position (FIG. 10), the ring 134 is loosened so that the outer shaft 34 can experience sliding motion inside the ring 134. When the handle 138 is in the closed position (FIG. 9), the ring 134 is tightened so that the outer shaft 34 cannot experience any sliding motion inside the ring 134. Additional screws 144 extend through holes 146 in the bottom plate 132 and holes 148 in the bottom wall 128 to secure the clamping assembly 130 inside the hub 122. An opening 170 is provided in the cylindrical housing 126 to allow the user with access to the handle 138.

The lower end of the outer shaft 34 is secured to a central opening in the base 102 via screws 152. The base 102 has a notched opening 154 along its peripheral edge to allow the wire 94 to be fitted therethrough, so as to function to keep the length of the wire 94 straight and against the shafts 32 and 34 during use.

A plurality of legs 124 are pivotably secured to the hub 122. Specifically, three legs 124 are shown in the present embodiment, although two, four or more legs 124 can be also be used. Each leg 124 has a curved outer profile so that the outer profile of the combined legs 124 will align and match with the cylindrical profiles of the hub 122, the handle assembly 30, the hub 25 and the illumination devices 22 and 24, so that the entire lighting apparatus 20 will have a slim cylindrical profile when it has been folded up for storage. See FIG. 2. The upper end of each leg 124 is provided with a pin or shaft 160 that pivotably connects the upper end of the leg 124 to the bottom wall 128. A pair of support rods 162 is provided to pivotably connect each leg 124 to the base 102. In particular, the upper end of each rod 162 is pivotably connected (via a pin) to a connection block 164 that is secured to the inside surface of the leg 124, and the lower end of each rod 162 is pivotably connected (via a pin) to a connection block 166 at the base 102. See FIGS. 5 and 6. Thus, the legs 124 can be moved in unison (i.e., together at the same time) between an open position (FIGS. 1, 5 and 6) and a closed position (FIG. 2) along the pivots defined by the pins 160, and the pins at the connection blocks 164 and 166.

In use, the lighting apparatus 20 can be opened from the closed position of FIG. 2 according to the following steps. First, the user reaches his/her hands through the opening 170 to pull the handle 138 to open the clamping assembly 130 (from FIG. 9 to FIG. 10). This loosens the grip of the ring 134 on the outer shaft 34. Then the user pulls the legs 124 apart. This causes the hub 122 to slide downwardly along the outer shaft 34 and the legs 124 to spread apart through the pivoting actions along the pins 160, and the pins at the connection blocks 164 and 166. When the hub 122 reaches its desired position along the outer shaft 34, the user can close the handle 138 (from FIG. 10 to FIG. 9) to lock the hub 122 at the desired position along the outer shaft 34. The user can select any location along the outer shaft 34 to lock the handle 138, depending on the height and stability desired by the user. For example, if the legs 124 are wider apart, the apparatus 20 will be more stable but the overall height of the apparatus 20 will be less than if the legs 124 are not as wide apart, where there is less overall stability but the overall height of the apparatus will be higher.

Next, the user pulls open the handle 120 to loosen the grip of the ring 104 on the inner shaft 32. The user can raise or pull the inner shaft 32 from inside the outer shaft 34 until the illumination devices 22 and 24 are at the desired height. The user can then close the handle 120 to lock the shafts 32 and 34 at the selected position.

Finally, the user can open out and adjust the illumination devices 22 and 24 in the manner shown in FIGS. 3 and 4. FIG. 1 illustrates one example of a resulting orientation.

To fold and collapse the lighting device 20 for storage from the orientation shown in FIG. 1, the steps can be reversed. The illumination devices 22 and 24 can be folded towards each other. Then the handle 120 is opened to slide the inner shaft 32 back into the outer shaft 34, and then the handle 120 is closed. Then the handle 138 is opened to slide the hub 122 upwardly along the outer shaft 34 until the hub 122 abuts the handle assembly 130 (see FIG. 2). As the hub 122 slides upwardly along the outer shaft 34, the legs 124 are folded inward towards each other.

Magnet pieces 168 can be provided in the wall 46 of each illumination device 22 and 24 so that the two illumination devices 22, 24 can be coupled together during storage. In addition, three clips 172 are provided in spaced-apart manner around the periphery of the base 102, with each clip 172 adapted to engage a notch 174 on the inside of each leg 124 when the three legs 124 are folded together against the base 102. The clip 172 and the notch 164 function as a locking mechanism to secure the legs 124 together, and to secure the entire light apparatus 20 together in the storage position.

The housings 40, 52 and 126, and the legs 124 can all be made from the same material, such as plastic or metal or any composite material.

While the description above refers to particular embodiments of the present invention, it will be understood that many modifications may be made without departing from the spirit thereof.

What is claimed is:

1. A lighting apparatus comprising:
   an upper hub;
   a base;
   a lower hub;
   a pair of illumination devices that are pivotably supported at the upper hub, each illumination device being pivotable up and down towards each other, as well as being rotatable;
   a telescoping shaft assembly having an inner shaft and an outer shaft, with the inner shaft telescopically received inside the outer shaft, the inner shaft having an upper end that is secured to the upper hub, and the outer shaft having a lower end that is secured to the base;
   a plurality of legs that are connected to the lower hub and the base for pivoting motion therebetween; and
   a handle assembly located below the upper hub, the handle assembly having a handle grip section and a wire storage section.

2. The apparatus of claim 1, wherein each leg has an upper end that is pivotably connected to the lower hub, and at least one support rod pivotably connects each leg with the base.

3. The apparatus of claim 1, wherein the handle assembly further includes an inner core and a clip provided along the inner core, the wire storage section having an outer plate connected to the inner core by a stem, with an electrical wire extending from the inner core and wound around the stem, and with a portion of the electrical wire secured in the clip, when the lighting apparatus is to be collapsed for storage.

4. A lighting apparatus comprising:
an upper hub;
a base;
a lower hub;
a pair of illumination devices that are pivotably supported at the upper hub, each illumination device being pivotable up and down towards each other, as well as being rotatable;
a telescoping shaft assembly having an inner shaft and an outer shaft, with the inner shaft telescopically received inside the outer shaft, the inner shaft having an upper end that is secured to the upper hub, and the outer shaft having a lower end that is secured to the base; and
a plurality of legs that are connected to the lower hub and the base for pivoting motion therebetween;
wherein each illumination device has a housing that houses a light source, and a connection bracket secured to a bottom wall of the housing, with the bracket having at least one leg that is pivotably connected to the upper hub for up-down pivoting motion via a pivoting sleeve that extends from the upper hub.

5. The apparatus of claim 4, wherein the bracket is secured at an opening at the bottom wall of the housing to an inner block, with a portion of the bottom wall sandwiched between the bracket and the inner block in a manner such that the housing can be rotated.

6. The apparatus of claim 5, wherein the bracket is secured to the inner block by at least one screw, wherein the housing can be rotated by 360 degrees about the axis defined by the screw.

7. The apparatus of claim 1, wherein the legs, the illumination devices and the hubs all have a curved outer profile such that the outer profiles of the legs, illumination devices and hubs are aligned when the apparatus is folded into a storage position.

8. The apparatus of claim 7, wherein the shafts are retained inside the legs when the apparatus is in the storage position.

9. The apparatus of claim 7, further including a locking mechanism that secures each leg to the base when the apparatus is in the storage position.

10. The apparatus of claim 4, wherein the leg has an opening, and further including a pivoting shaft that extends through the sleeve and the opening in the leg so that the illumination device is pivoted up and down along the axis defined by the shaft.

11. The apparatus of claim 4, wherein the legs, the illumination devices and the hubs all have a curved outer profile such that the outer profiles of the legs, illumination devices and hubs are aligned when the apparatus is folded into a storage position.

12. The apparatus of claim 11, wherein the shafts are retained inside the legs when the apparatus is in the storage position.

13. The apparatus of claim 11, further including a locking mechanism that secures each leg to the base when the apparatus is in the storage position.

14. The apparatus of claim 4, wherein each leg has an upper end that is pivotably connected to the lower hub, and at least one support rod pivotably connects each leg with the base.

15. The apparatus of claim 4, further including a handle assembly located below the upper hub, the handle assembly having a handle grip section and a wire storage section.

* * * * *